United States Patent [19]

Roder et al.

[11] Patent Number: 4,862,559
[45] Date of Patent: Sep. 5, 1989

[54] CONDITIONING OF BALED MATERIALS

[75] Inventors: Edward A. Roder, Narre Warren; Gregory J. Napper, Frankston, both of Australia

[73] Assignee: Australian Wool Corporation, Parkville, Australia

[21] Appl. No.: 137,132

[22] Filed: Dec. 23, 1987

[30] Foreign Application Priority Data

Dec. 23, 1986 [AU] Australia .................. PH09693

[51] Int. Cl.⁴ .................................... D01G 37/00
[52] U.S. Cl. .................................... 19/66 R; 68/5 C
[58] Field of Search .................. 19/66 R; 68/5 C

[56] References Cited

U.S. PATENT DOCUMENTS 233,288 10/1880 Seeland .................. 19/66 R
4,667,373 5/1987 Roder .................... 19/66 R

FOREIGN PATENT DOCUMENTS 0166588 1/1965 U.S.S.R. .................. 19/66 R

Primary Examiner—Werner H. Schroeder
Assistant Examiner—S. M. Current
Attorney, Agent, or Firm—Cushman, Darby & Cushman

[57] ABSTRACT

For conditioning baled material, such as wool, which is subject to taking a set upon being frozen or remaining stored for an extended period, steam is forced into the bale from two opposite sides for a short period of time, over a substantial part of the surface area of each of those sides. Thereafter, moisture-laden heated air under substantially higher pressures are forced into the bale for a longer period of time, in order to reduce the temperature of the steam and substantially uniformly distribute the heat. The steam and heated air introduction steps may be repeated, in alternation.

10 Claims, 3 Drawing Sheets

CONDITIONING OF BALED MATERIALS

RELATED APPLICATIONS

This application is related to U.S. Pat. No. 4,667,373, issued 3rd Jan. 1986.

FIELD OF THE INVENTION

This invention relates to a method and apparatus for conditioning baled materials such as wool and other fibrous materials. The invention is more particularly concerned with improvements in or modifications of the method and apparatus described in our U.S. Pat. No. 4,667,373, issued 3rd Jan. 1986.

BACKGROUND OF THE INVENTION

When wool is transported in bales to countries having cold climates, the wool is often frozen for considerable periods of the year. Similarly, when baled and dumped wool is placed in long term storage, the fibre develops a set, the extent of which depends on the factors of time, temperature, density and moisture content. It will be appreciated that baled wool which has a high set factor caused by low temperatures and/or long term storage is extremely difficult to open for further processing and the wool must dwell for considerable periods of time until the set in the wool eventually releases.

While it is known, for example from U.S. Pat. No. 233,288 Seeland and Russian Pat. No. 166588, to inject steam into frozen bales through a probe which penetrates the bale to speed the thawing process, thawing does not take place uniformly and difficulties are often experienced in obtaining adequate penetration of the probe due not only to the frozen state of the fibres but also to the high density of the fibres in the bale. Accordingly, the injection of steam in this manner is not a satisfactory solution to the problem of frozen bales and similarly does not provide a solution to the problem of opening high density, long term storage bales.

In our earlier patent referred to above, we have described a bale conditioning apparatus and method which constituted a significant improvement on the previously used conditioning methods, including the injection of steam as described above and the placing of bales in a warming room. However, further experimentation revealed that the forcing of a mixture of steam and moisture-laden heated air into the bales still resulted in bale residence times which were unacceptably long, that is, in excess of 20 minutes. It was found that the steam and moisture-laden heated air mixture built up in the bale and prevented further penetration of heat through the bale. The maximum allowable pressure (of the order of 120 kPa) was found to be insufficient to cause adequate penetration of the required heat front through the bale in an acceptable period of time. Any increase in the pressure of course resulted in an increase in temperature and, as has been found in the case of prior art steam injection methods, this often results in localized yellowing and oother damage to the wool fibres contained in the bale.

SUMMARY OF THE INVENTION

It is, accordingly the object of the present invention to provide a method and apparatus for conditioning baled materials in which the above problem is at least substantially ameliorated.

In a first aspect of the present invention, there is provided a method of conditioning baled materials comprising the steps of:

1. forcing dry steam under low pressure into the bale to be conditioned for a short period of time over a substantial part of the surface area of at least two sides of the bale so that said steam penetrates the material in the bale in a relatively uniform manner, and 2. forcing moisture laden heated air under substantially higher pressures into the bale for a longer period of time over a substantial part of the surface area of at least two sides of the bale to reduce the temperature of the steam in the bale and to substantially uniformly distribute the heat built up in the bale throughout the bale.

In another aspect, the invention provides an apparatus for conditioning baled material comprising at least two plenum pads each dimension to cover a substantial part of the surface area of a side of a bale to be treated, means for clamping said pads in sealing contact with at least two opposite sides of the surface of said bale, means for forcing steam and moisture laden heated air under pressure into said bale via said plenum pads whereby said steam/air penetrates the material in said bale in a relatively uniform manner, and means for controlling the introduction of said steam/air in two discrete steps:

1. forcing dry steam under low pressure into the bale to be conditioned for a short period of time over a substantial part of the surface area of at least two sides of the bale so that said steam penetrates the material in the bale in a relatively uniform manner, and 2. forcing moisture laden heated air under substantially higher pressures into the bale for a longer period of time over a substantial part of the surface area of at least two sides of the bale to reduce the temperature of the steam in the bale and to substantially uniformly distribute the heat built up in the bale throughout the bale.

In one preferred form of the above-defined aspects of the invention, saturated dry steam is first forced into the bale at a low pressure of from about 40 kPa to about 55 kPa at a temperature of from 80° C. to about 120° C. for a period of about 140 to 240 seconds and in the second step, saturated compressed air is forced into the bale at pressures in the approximate range 100 to 300 kPa at temperatures in the region of 50° to 70° C. for a total period of the order of four to eight minutes.

In a particularly preferred form of the invention, steps 1 and 2 defined above are preferably repeated at least once to provide the total treatment time periods defined above, in other words, steps 1 and 2 are initially performed for half of the total period defined above and are then subsequently performed for the remainder of that period. This reduces the heat shock to the fibres contained in the bale, which is particularly important if the fibres are wool. It will, of course, be appreciated that the time periods referred to above are relatively arbitrary and are dictated by the density of the bale to be conditioned. Obviously, if the bale is not particularly dense, the time period may be significantly reduced. The time periods indicated above are for bales having a density of the order of 700 kg/m$^3$.

At the present stage of development, a plenum pad clamping force of the order of 25 to 35 tonnes is sufficient to cause adequate sealing of the plenum pads in contact with the surface of the bale whereby substantially uniform penetration of the air/steam into the material in the bale is achieved.

In a particularly preferred form of the invention, plenum pads are clamped to two opposed side surfaces of a bale and steam and moisture-laden air are caused to penetrate the fibres in the bale under the conditions outlined above. Experiments have shown that under these conditions, the temperature of a bale having a fibre density of the order of 700 kg/m may be elevated from minus 20° C. to 65° C. in approximately nine minutes. Similarly, other experiments have shown that long term storage bales which have previously been extremely difficult to open may be opened with relative ease after treatment according to the invention for a period of time of the order of that indicated above under the conditions indicated above.

BRIEF DESCRIPTION OF THE DRAWINGS

One presently preferred embodiment of the invention is shown schematically in the accompanying drawings, in which.

DESCRIPTION OF THE PREFERRED EMBODIMENT

Figure 1:
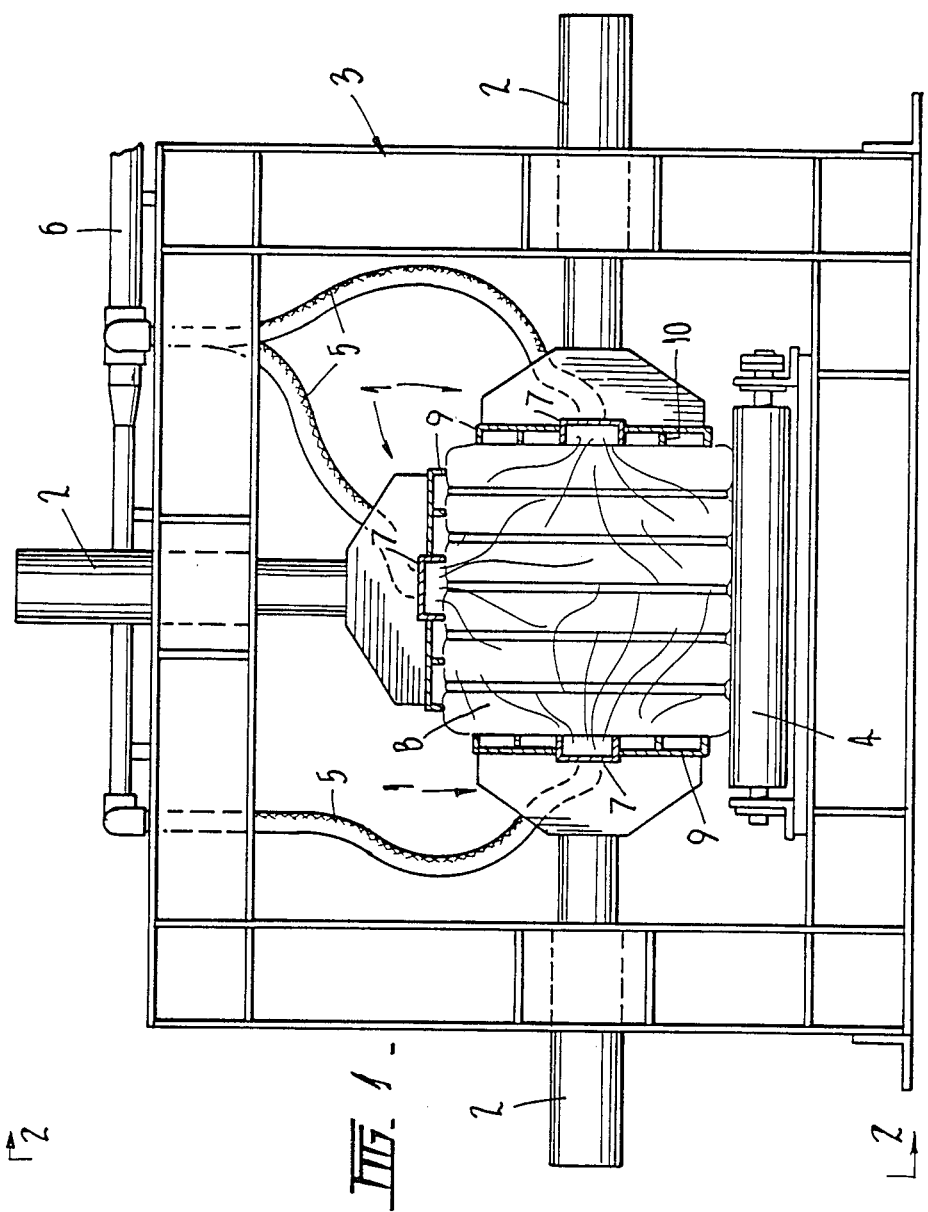
FIG. 1 is a front elevation of an apparatus embodying the invention.
Figure 2:
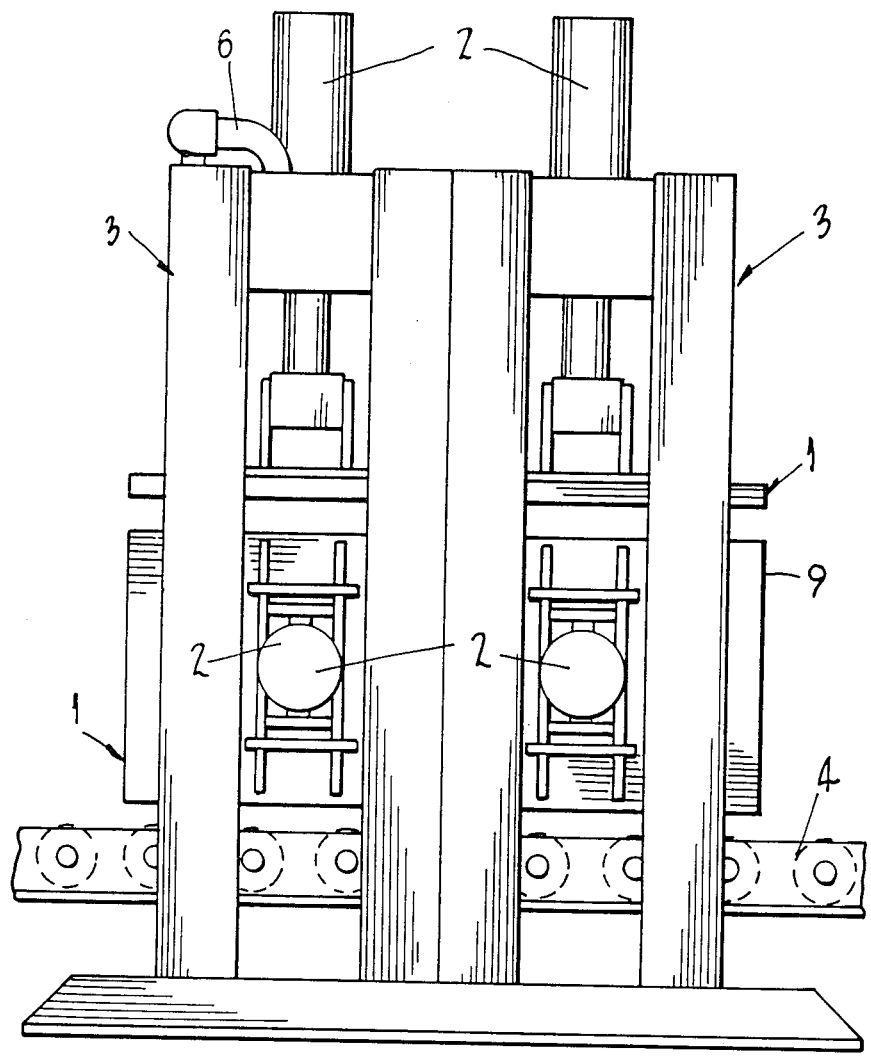
FIG. 2 is a side elevation of the apparatus of FIG. 1.
Figure 3:
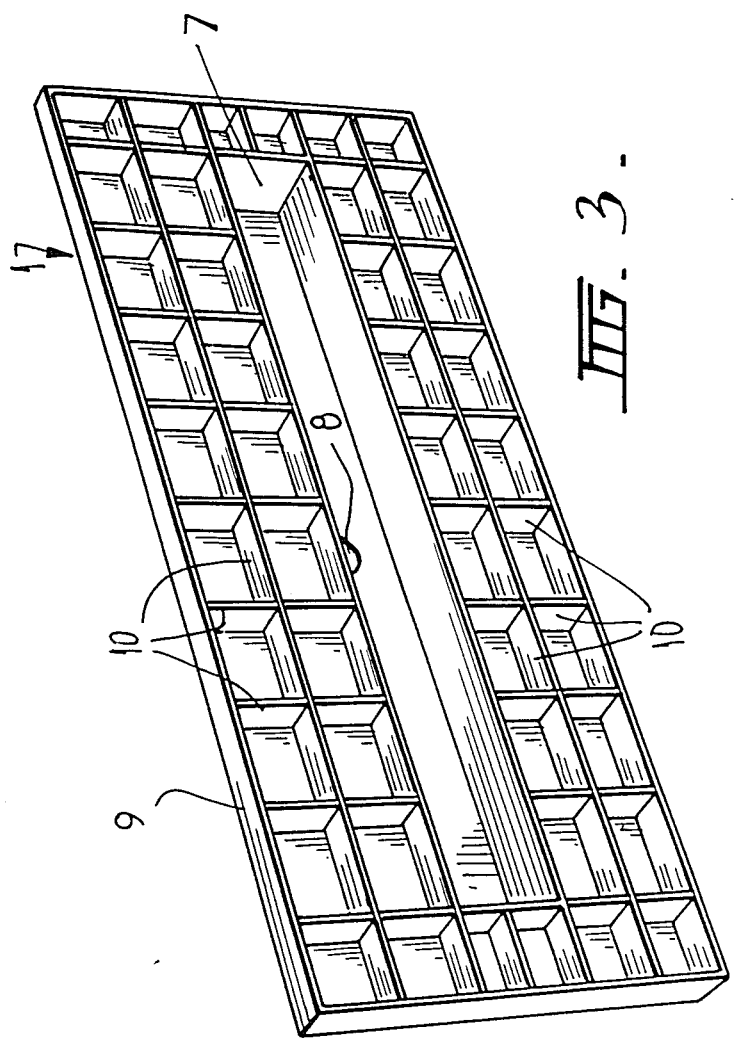
FIG. 3 shows the construction of one of the plenum pads used in the apparatus of FIGS. 1 to 3.

Referring firstly to FIGS. 1 to 3 of the drawings, it will be noted that three plenum pads 1 are supported by pairs of clamping cylinders 2 which are, in turn, supported by a support frame 3 which straddles a conveyor 4 upon which a dumped bale B is supported for treatment. As indicated above, a clamping force of the order of 25 to 35 tonnes is applied between the opposed plenum pads and between the upper plenum pad and the conveyor 4. Steam and air are delivered, in the manner described further below, to each plenum paid 1 via flexible tubing 5 attached to supply piping 6 supported by the frame 3.

Referring now to FIG. 3 of the drawings, each plenum pad will be seen to comprise a central open-ended channel 7 into which moisture laden heated air is delivered through an opening 8 via tubing 5. The channel 7 is surrounded by a frame 9 within which divider plates 10 form a honeycomb sealing structure. Although other methods of sealing the plenum pad may be adopted, it has been found that the honeycomb structure shown in FIG. 3 is both simple and effective.

To condition a bale, saturated dry steam (i.e. saturated steam with all free moisture removed) at a temperature of between 100° C. and 110° C., and most preferably around 105° C. to 109° C., is delivered to each plenum pad 1 at a regulated pressure of between 40 kPa to 55 kPa, and most preferably around 45 kPa, for a period of about 140 to 240 seconds, at most preferably around about 180 seconds. The time period selected is empirical and is dependent on the density of the material in the bale. The indicated time periods have been found to be satisfactory for bales of wool at densities of the order of 700 kg/m$^3$.

The selected pressure of the steam is controlled by a known pressure control valve (not shown) while the time period is controlled by means of a known prime logic control system (computer). It will be appreciated that the system may be controlled by mechanical or electrical timing means or manually.

Saturated compressed air (relative humidity approximately 90%–100%) is then delivered to the plenum pads 1 at a temperature of between 50° C. and 65° C., and most preferably around 55° C., at a pressure of between 100 kPa and 300 kPa, most preferably around 200 kPa, for a period of about 160 seconds to 220 seconds, and most preferably around 180 seconds. This treatment step reduces the intensity of the heat delivered to the bale by the steam and substantially unifirmly distributes the heat built up in the bale throughout the bale. The saturated compressed air is preferably supplied by means of a liquid ring compressor (not shown), which is capable of supplying saturated compressed air at pressures up to 300 kPa. Thus, heated saturated air is forced through bale at high pressure to evenly distribute the heat previously introduced into the bale by means of the steam. This substantially speeds-up the conditioning process and avoids the problems associated with the introduction of high temperature steam over long periods.

The pressure of the compressed air is again controlled in a known manner and the timing is maintained by the control system referred to above, or in any other suitable manner.

To complete the conditioning process, the above steps are repeated to provide a total preferred conditioning time of the order of nine minutes.

Although the use of two plenum pads of the above type is preferred and have been found to achieve good results three or more plenum pads may be used to increase the uniformity of penetration of the baled material.

The apparatus shown in the accompanying drawings has been successfully tested with frozen dumped bales and with long term storage bales which were known from past experience to be difficult to open. In the case of frozen bales, it was found that a bale frozen to a temperature of -20 C. could be elevated to a temperature of 65° C. in approximately nine minutes. Similarly, long term storage bales conditioned for a similar period were found to be sufficiently conditioned to be easy to open.

We claim:

1. A method of conditioning baled materials comprising the steps of:
   (a) forcing dry steam under low pressure into the bale to be conditioned for a short period of time over a substantial part of the surface area of at least two sides of the bale so that said steam penetrates the material in the bale in a relatively uniform manner, and
   (b) forcing moisture laden heated air under substantially higher pressures into the bale for a longer period of time over a substantial part of the surface area of at least two sides of the bale to reduce the temperature of the steam in the bale and to substantially uniformly distribute the heat built up in the bale throughout the bale.

2. The method of claim 1, wherein step (a) involves forcing saturated dry steam into the bale at a low pressure of from about 40 kPa to about 55 kPa at a temperature of from 80° C. to about 120° C. for a period of about 140 to 240 seconds, and in step (b) saturated compressed air is forced into the bale at pressures in the approximate range of 100 to 300 kPa at temperatures in the region of 50° to 70° C. for a total period of the order of four to eight minutes.

3. The method of claim 2, wherein steps (a) and (b) are performed for an initial period of approximately half of the total period defined and are then performed for a second period comprising the remainder of said total period.

4. The method of claim 3, wherein the temperature of said saturated dry steam lies between 100° C. and 110° C.

5. The method of claim 4, wherein the temperature of said saturated dry steam lies between 105° C. and 109° C. at a regulated pressure of about 45 kPa for a period of about 180 seconds.

6. The method of claim 5, wherein said baled material is wool which has been compressed to a density of the order of 700 kg/m$^3$.

7. An apparatus for conditioning baled material, comprising:
  at least two plenum pads, each dimensioned to cover a substantial part of the surface area of a side of a bale to be treated;
  means for clamping said pads in sealing contact with at least two opposite sides of the surface of said bale;
  means for forcing steam and moisture-laden heated air under pressure into said bale via said plenum pads, whereby said steam/air penetrates the material in said bale in a relatively uniform manner;
  and means for controlling the introduction of said steam/air in two discrete steps including,
    means for forcing dry steam under low pressure into the bale to be conditioned for a short period of time over a substantial part of the surface area of at least two sides of the bale so that said steam penetrates the material in the bale in a relatively uniform manner, and
    means for forcing moisture-laden heated air under substantially higher pressures into the bale for a longer period of time over a substantial part of the surface area of at least two sides of the bale to reduce the temperature of the steam in the bale and to substantially uniformly distribute the heat built-up in the bale, throughout the bale.

8. The apparatus of claim 7, wherein:
  said controlling means includes means for controlling the pressure and temperature of said saturated dry steam to a pressure about 40 kPa and about 55 kPa and a temperature between about 80° C. and about 120° C., said controlling means including timing means for controlling the time of application of said saturated dry steam to the bale to a period of about 140 to 240 seconds, said controlling means further including means for controlling the pressure and temperature of said saturated compressed air to a pressure in the approximate range 100 to 300 kPa at temperatures in the region of 50° to 70° C., said timing means further controlling the total period of application of said saturated compressed air to said bale to a total period of the order of 4 to 8 minutes.

9. The apparatus of claim 8, wherein:
  said means for controlling the pressure and temperature of said saturated dry steam controls the temperature within the range 100° C. and 110° C.

10. The apparatus of claim 7, wherein:
  said means for controlling the pressure and temperature of said saturated dry steam maintains the pressure at a regulated pressure of about 45 kPa and maintains the temperature within the range 105° C. to 109° C., said timing means controlling the period of application of said saturated dry steam to the bale to a period of about 180 seconds.

* * * * *